United States Patent [19]
Brown et al.

[11] Patent Number: 5,421,675
[45] Date of Patent: Jun. 6, 1995

[54] APPARATUS FOR NEAR VERTICAL LAYING OF PIPELINE

[75] Inventors: Robert W. Brown; Michael J. Legleux, both of New Orleans, La.; Jesse R. Wilkins, Picayune, Miss.

[73] Assignee: McDermott International, Inc., New Orleans, La.

[21] Appl. No.: 154,320

[22] Filed: Nov. 18, 1993

[51] Int. Cl.[6] .......................... B63B 35/04; F16L 1/00
[52] U.S. Cl. .................... 405/170; 405/158; 405/166
[58] Field of Search ............ 405/154, 158, 166, 167, 405/169, 170, 165

[56] References Cited

U.S. PATENT DOCUMENTS

| | | | |
|---|---|---|---|
| 1,220,189 | 3/1917 | Chapman | 405/167 |
| 3,581,506 | 6/1971 | Howard | 405/166 |
| 3,585,806 | 6/1971 | Lawrence | 405/166 |
| 3,680,322 | 8/1972 | Nolan et al. | 405/166 |
| 3,860,122 | 1/1975 | Cernosek | 405/166 X |
| 4,068,490 | 1/1978 | Jegousse | 405/166 |
| 4,486,123 | 12/1984 | Koch et al. | 405/169 |

FOREIGN PATENT DOCUMENTS

| | | | |
|---|---|---|---|
| 1532570 | 7/1968 | France | 405/166 |
| 2204106 | 11/1988 | United Kingdom | 405/166 |

Primary Examiner—Dennis L. Taylor
Assistant Examiner—John A. Ricci
Attorney, Agent, or Firm—Robert J. Edwards; D. Neil LaHaye

[57] ABSTRACT

An apparatus for near vertical laying of pipeline offshore. A support frame and movable deck on a lay vessel support a tower at the desired angle for pipe laying. The tower has a travel block that is movable between open and closed positions for receiving a pipe section and supporting the weight of the pipe or pipeline. The travel block is adapted for movement along the length of the tower for raising or lowering the pipe and pipeline. A pedestal that is movable between open and closed positions for receiving a pipe section and supporting the weight of the pipeline is positioned near the bottom of the tower and adapted to transfer the weight of the pipeline from the travel block to the pedestal without the need to open the travel block. A strongback with adjustable clamps is used to grasp a pipe section from a ready rack and transfer the pipe section into the tower for addition of the pipe section to the pipeline. The strongback is guided into and up the tower by rails. A stinger extends down from the lower end of the tower and is provided with clamps to grip the pipeline during operations. The main portion of the stinger may be pivoted up adjacent the lay vessel when pipe laying operations are not in progress.

13 Claims, 8 Drawing Sheets

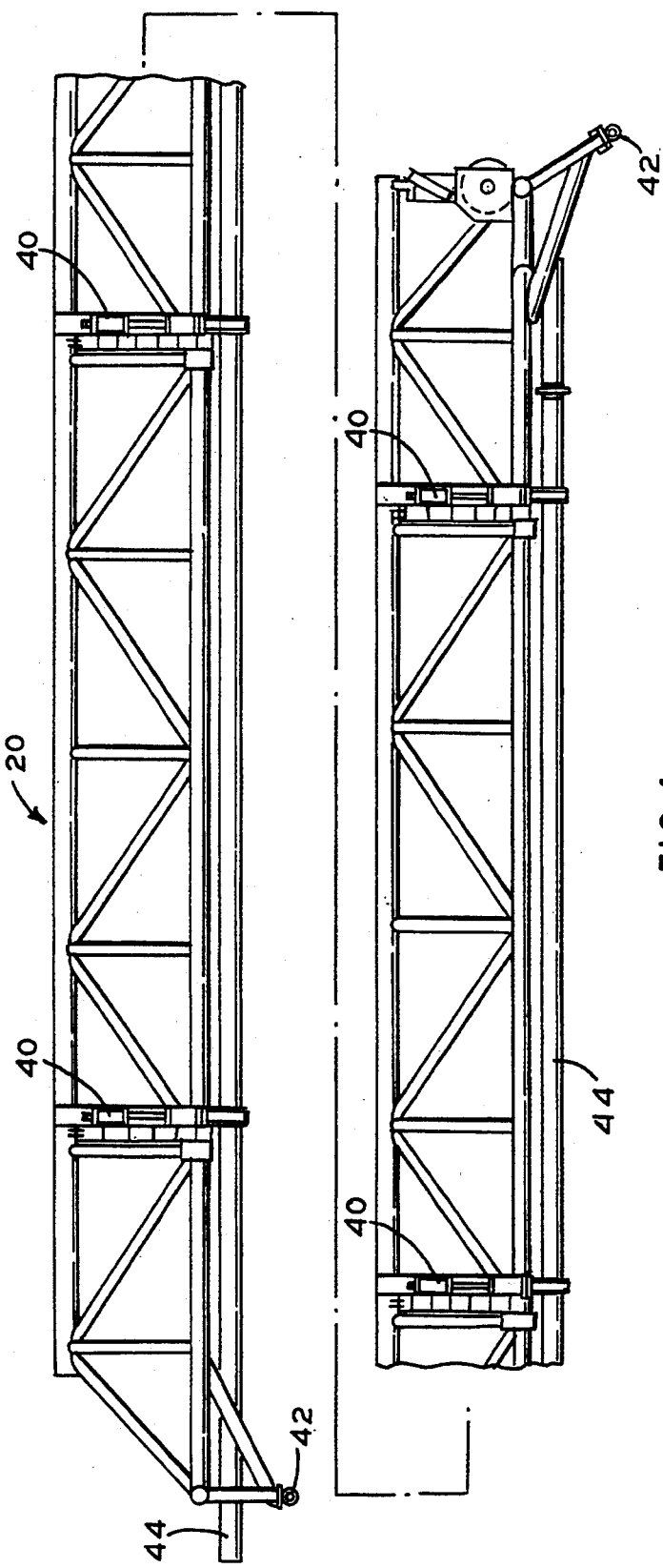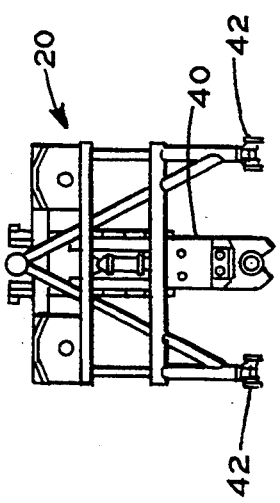

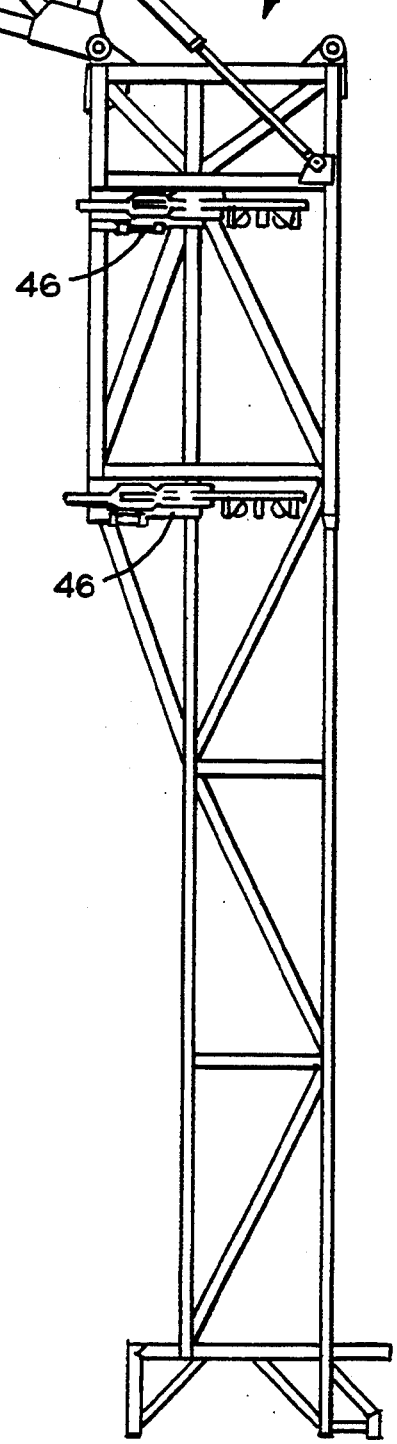
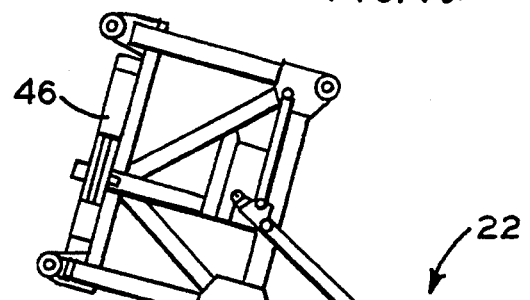
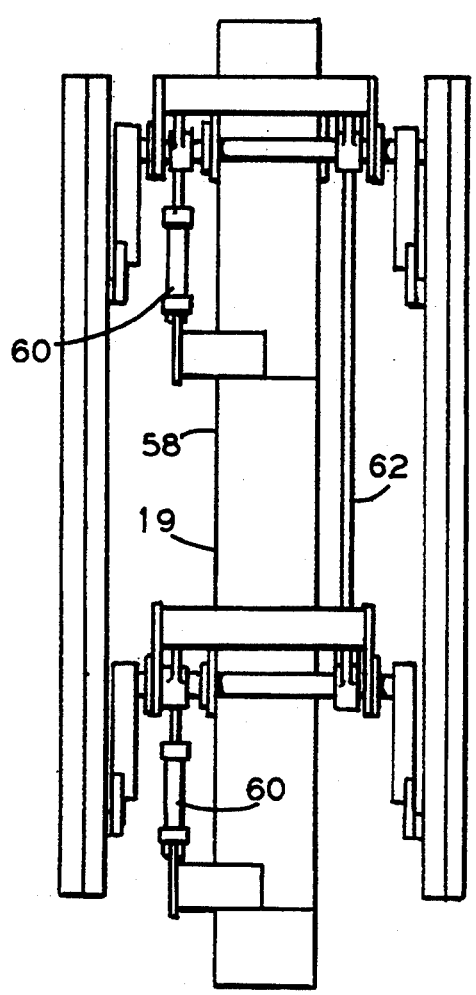

APPARATUS FOR NEAR VERTICAL LAYING OF PIPELINE

BACKGROUND OF THE INVENTION

1. Field of the Invention

The invention is generally related to the laying of pipeline offshore and particularly to the near vertical laying of pipeline offshore in deep water.

2. General Background

The laying of offshore pipelines has been done for many years utilizing the technique referred to as S-lay. In the S-lay technique, joints of pipe are added to the pipeline in a horizontal position on the deck of a lay barge. The pipeline then curves over the stern of the barge, angles down toward the seabed, curves back to horizontal and lays on the seabed. The profile of the pipeline from the lay barge to the seabed is in the form of a long "S" which leads to the name of S-lay.

Although S-lay has been the method of choice for virtually all pipeline installed to date, there are physical limitations on the use of this technique. Chief among these is water depth. As the water depth increases, the ability to move the vessel on anchors becomes more and more difficult and the horizontal component of the pipe tension becomes greater and greater. The offshore pipeline industry has been aware of this problem for years and has as a solution, accepted the concept of near vertical lay, called J-lay, as the system of choice for deep water pipe laying. It should be understood that the definition of deep water, when referring to the use of J-lay, is a direct function of pipe diameter. This relationship is a result of the minimum water depth required for pipe of a certain diameter to achieve the proper flex during the vertical laying operation. There is also a maximum practical depth for specific pipe diameters. As an example, pipe having a diameter of 6.625 inches requires a minimum water depth, with no water in the pipe, of 124 feet. At the opposite end of the scale, pipe having a diameter of 42 inches requires a minimum water depth, with no water in the pipe, of 1,337 feet.

Considerable work has been done over the years on the theoretical aspects of the J-lay concept, but very little work has been done on the actual hardware and equipment needed for this type of system. Most of the systems proposed have utilized existing semi-submersible drilling units. These units, which are capable of being modified for this service, were not built to be used as pipe layers and can not be made to be very efficient during pipe laying operations.

Another problem area in laying pipeline offshore is the storage, transportation, and transfer of pipe to the lay vessel. In normal operations, the line pipe for the pipeline is transported to the field in forty foot long joints. The transport vessel, which is usually a small material barge or a special purpose pipe haul boat, is tied to the side of the lay vessel as the pipe is transferred to the lay vessel. Transfer of the pipe one joint at a time may take several days. The transfer of pipe from between vessels subject to sea induced motion is hazardous to personnel and equipment under good sea conditions and becomes impossible to do safely under bad conditions.

Applicants are aware of a system that utilizes a ramp that can be adjusted from horizontal to vertical. It uses large tensioners to grip the pipe and apply the necessary amount of tension to the system. This system has never been used for deep water pipeline construction.

Offshore pipe laying systems, those in use(S-lay) and theoretical proposals(J-lay), have certain things in common. The systems may or may not use pipe add ons that have been multi-jointed outside the system to provide pipe joint lengths greater than the normal forty foot pipe length. Theoretical J-lay systems have proposed joint lengths of eighty feet or more. A single station is used to accomplish the welding, NDT(non-destructive testing), and pipe coating of joints. In J-lay, it is necessary to have a means to transfer the pipe from the horizontal position on the lay vessel to a near vertical position on the lay line. It is also necessary to have some means of lowering the pipe as the lay vessel moves forward. A particular problem in this area has been the issue of devising an efficient manner of transferring the load of the pipeline to a holding mechanism so that the lowering mechanism can then be raised in preparation for receiving the weight of the next pipe joint. What is lacking in the art is a system that provides an efficient, time saving means of transferring the pipe from the horizontal position to a near vertical position with the lay line, positioning the new pipe in alignment for welding to the existing pipeline, lowering the pipeline with the new pipe added, and then continuously repeating the process.

SUMMARY OF THE INVENTION

The present invention addresses the above needs in a straightforward manner. What is provided is an apparatus for near vertical laying of a pipeline offshore. Pipe bins are provided that are capable of storing, transporting, and transferring between vessels up to twenty-five thousand feet of twelve and three-quarter inch outer diameter pipe. A pipe ready rack is positioned on the lay vessel adjacent a pipe bin for receiving a single prepared pipe joint. A strongback is used to lift the pipe joint from the ready rack and move it into a near vertical position in a tower on the lay vessel. The pipe joint is aligned and held in position over the pipeline by the strongback clamps (support type) and a weld clamp while the pipe joint is welded to the pipeline. A travel block supported by the tower receives the weight of the pipe joint and pipeline via a buckle arrester on the pipe and is used to lower the pipeline while the lay vessel moves forward in preparation to add another pipe joint. A pedestal on a movable deck receives the weight of the pipeline on the buckle arrester from the travel block and supports the pipeline while another pipe joint is being positioned for welding to the pipeline. The strongback is capable of being lowered to pick up and raise a pipe joint during the final welding phases to have a new pipe joint in position for welding to the pipeline as soon as possible after the pipeline is lowered.

BRIEF DESCRIPTION OF THE DRAWINGS

For a further understanding of the nature and objects of the present invention reference should be had to the following description, taken in conjunction with the accompanying drawings in which like parts are given like reference numerals and, wherein:

FIG. 3 is an elevation view of the strongback.
FIG. 4 is an end view of the strongback.

FIG. 9 is an elevation partial phantom view of the internal line up clamp and handling system.

FIG. 10 is an elevation view of the stinger.

DETAILED DESCRIPTION OF THE PREFERRED EMBODIMENT

Figure 1:
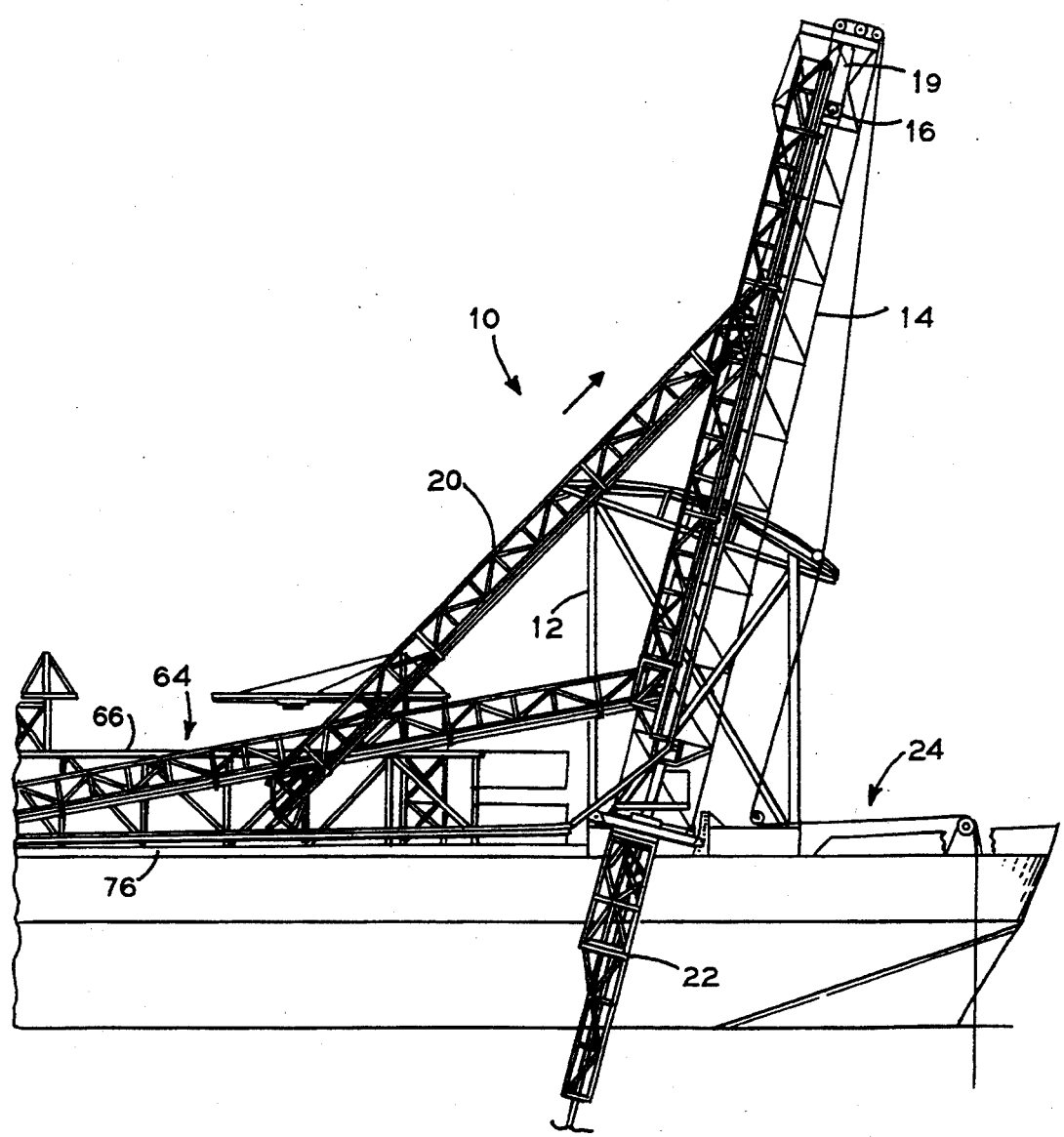
FIG. 1 is an elevation view of the invention.

Referring to FIG. 1, it is seen that the invention is generally indicated by the numeral 10. Apparatus 10 for near vertical laying of pipeline is generally comprised of support frame 12, movable deck 13, tower 14, travel block 16, pedestal 18 seen in FIG. 5 and 6, internal pipe clamp 19 seen in FIG. 9, strongback 20, and stinger 22.

Figure 12:
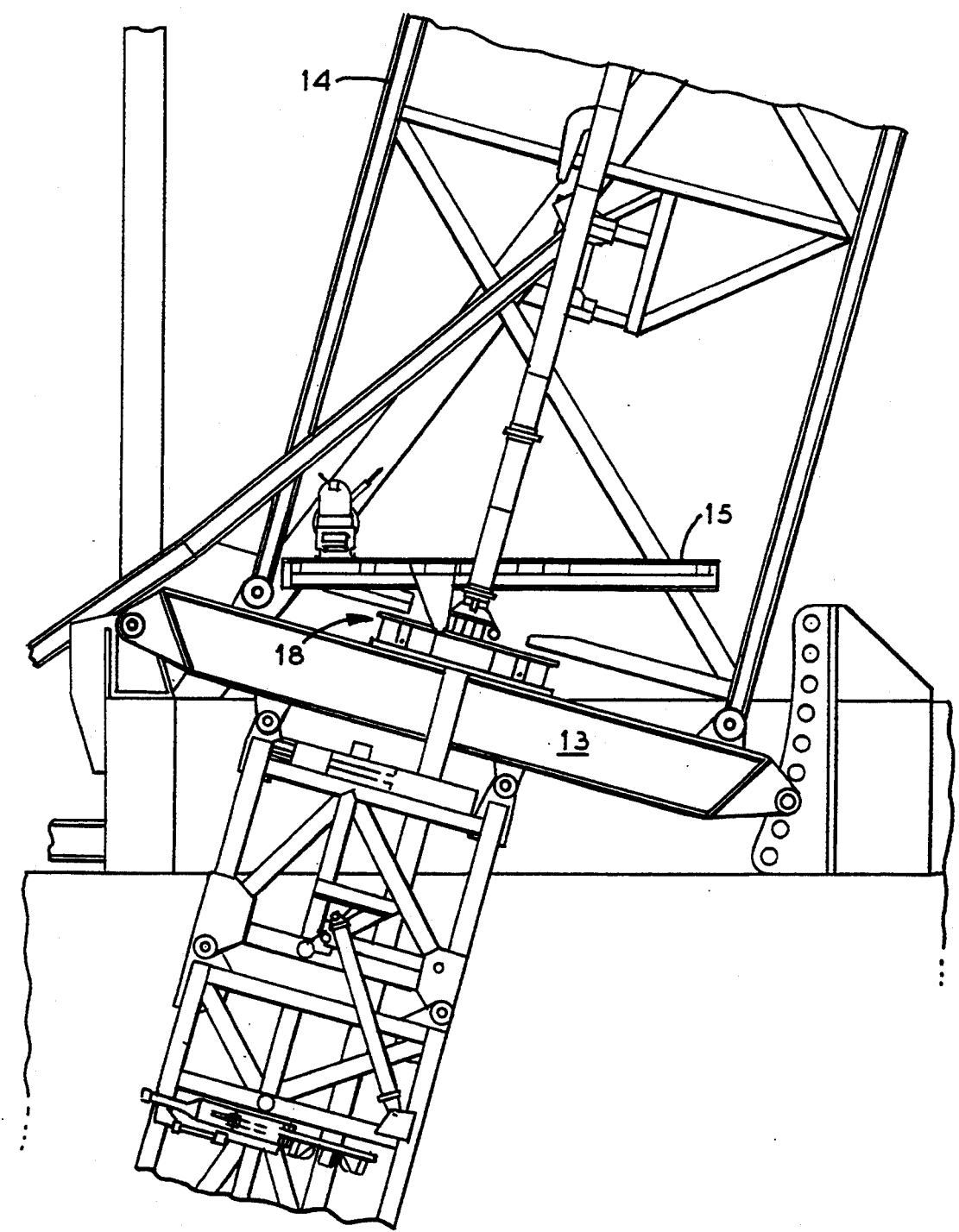
FIG. 12 is a detail view that illustrates the movable deck.

Support frame 12 is of any suitable shape and rigidly attached to the lay vessel 24. In the preferred embodiment, support frame 12 is adapted to pivotally receive movable deck 13 and tower 14 such that they may be moved between a first operative pipe laying position that includes several different angles as seen in FIG. 1 and a second stowed position for safety purposes during rough seas or travel of the lay vessel. To achieve this, movable deck 13 is pivotally attached at one side of its lower end to support frame 12 and can be rigidly attached at the opposing side of the lower end to support frame 12 as seen in FIG. 12. A variety of attachment points are provided so that deck 13 and tower 14 can be set at the desired angle. A winch and cables are used to raise and lower tower 14.

Figure 2:
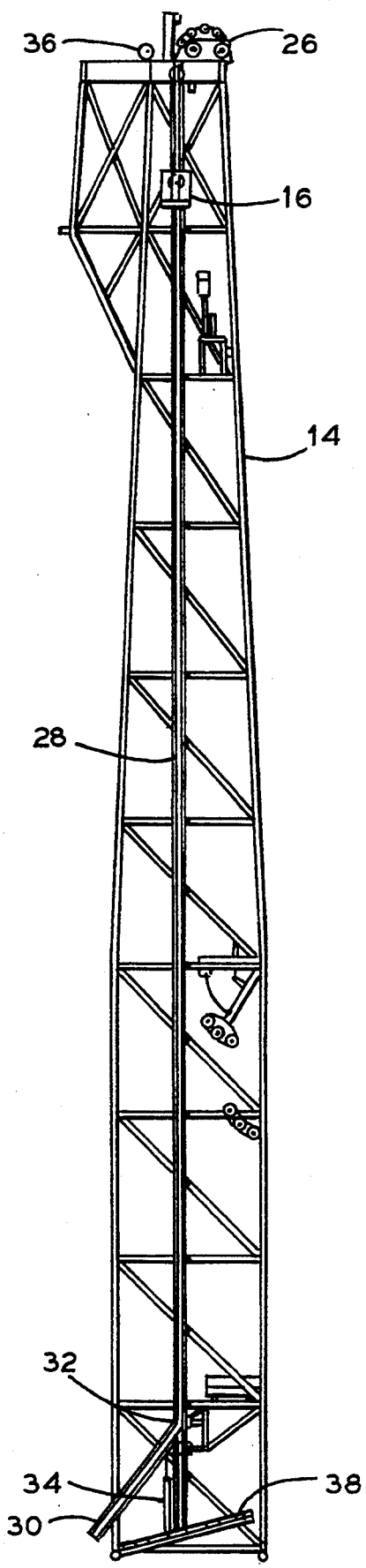
FIG. 2 is an elevation view of the tower.
Figure 5:
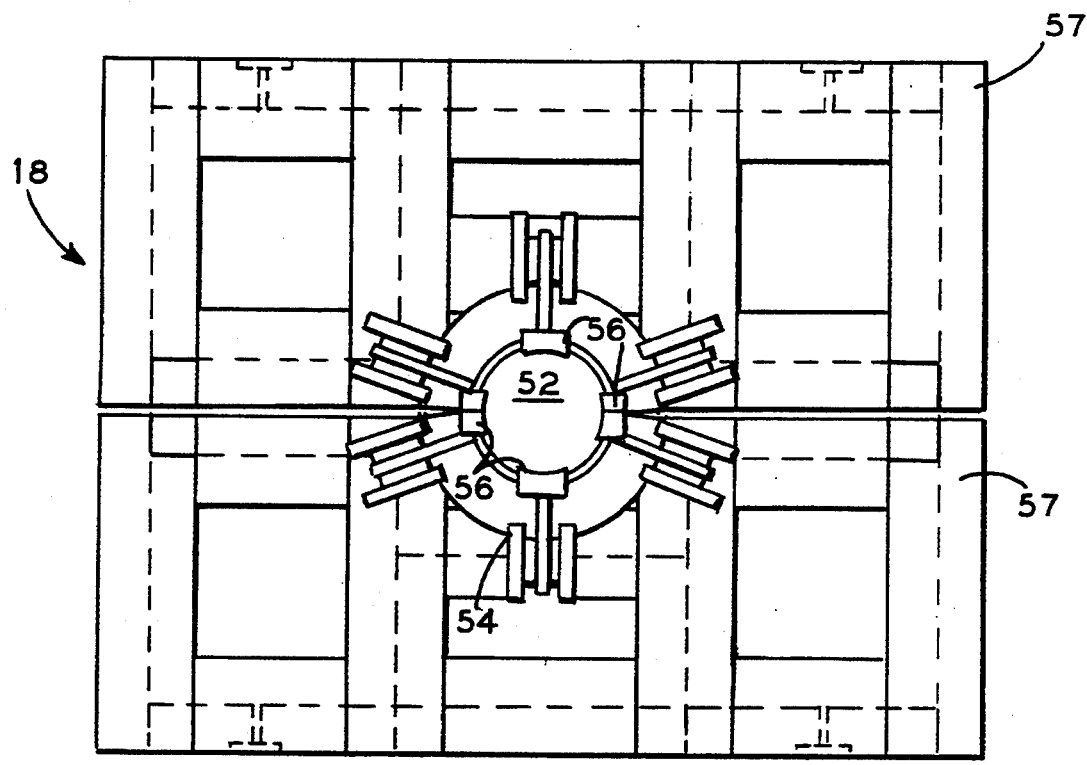
FIG. 5 is a plan view of the pedestal.
Figure 6:
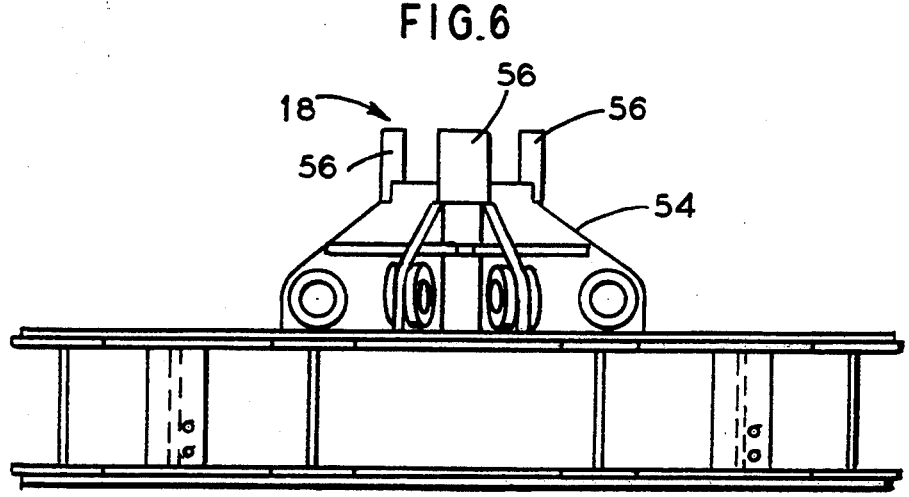
FIG. 6 is an elevation view of the pedestal.

As seen in the detail view of FIG. 12, tower 14 is mounted on movable deck 13. Work deck 15 may be pivotally attached to tower 14 or deck 13 so as to be adjustable to a horizontal position for personnel. Tower 14, seen in FIG. 2, is a U-shaped frame open on one side along its length and is designed to support the weight of the pipeline during the lowering or raising of the pipeline and to receive and guide the strongback into position in the tower so that a pipe joint may be added to the pipeline. Travel block 16 is received in tower 14 and supported by a cable sheave assembly 26 mounted on top of tower 14. Pedestal 18, seen in FIG. 5 and 6, is mounted on an adjustable work deck 38 at the lower end of tower 14. Internal pipe clamp 19 is movably positioned adjacent the top of tower 14. Means for guiding strongback 20 into and out of tower 14 is provided in the form of a pair of rails 28 on opposing sides of the tower that receive rollers on the strongback. A pair of transition rails 30 extend from the lower end of tower 14 at an angle to aid in the transition period when the strongback is moving between a position horizontal to the deck of the lay vessel and into or out of tower 14. A rail switch 32 is used at the junction of rail 28 and transition rail 30 to allow downward movement of strongback 20 in tower 14 once a pipe joint has been brought into tower 14 by strongback 20. A pair of hydraulic cylinders 34 attached to the lower end of tower 14 are positioned to receive and support strongback 20 during certain phases of the operation. Sheave 36 on the top of tower 14 provides a support point for a cable that is attached to one end of strongback 20 and is used in conjunction with a winch to raise and lower strongback 20 into and out of tower 14.

Strongback 20, seen in FIG. 3 and 4, is formed from a triangular shaped frame and is provided with a plurality of clamps 40 spaced along its length. Each end of strongback 20 is provided with rollers 42 that are sized to be received in rails 28 and 30 on tower 14. In its operational position, the flat portion of the triangle of strongback 20 faces the deck of the lay vessel on tower 14 and clamps 40 extend from the flat portion for gripping a pipe joint 44. Clamps 40 are adjustable so as to be capable of moving between a first retracted position and a second extended position to allow alignment of the pipe joint 44 with the pipeline for welding.

Stinger 22, seen in FIG. 1 and 10, is attached to the bottom of the movable work deck 13 (FIG. 12) and designed to provide support to the pipeline as it is lowered during forward movement of the lay vessel. Stinger 22 is formed from two sections that are pivotally attached to each other. The lower section is movable between a first retracted or folded position and a second extended position relative to the upper section and the work deck. In the first position, the lower section is positioned substantially parallel to the hull of the lay vessel to present little or no resistance to movement of the vessel when pipe laying operations are not underway. This also prevents damage to the stinger. In the preferred embodiment, stinger 22 is provided with three clamps 46 that can be used to support the pipeline during welding of a new pipe joint onto the pipeline. Stinger 22 matches the angle of tower 14 during pipe laying operations.

Figure 7:
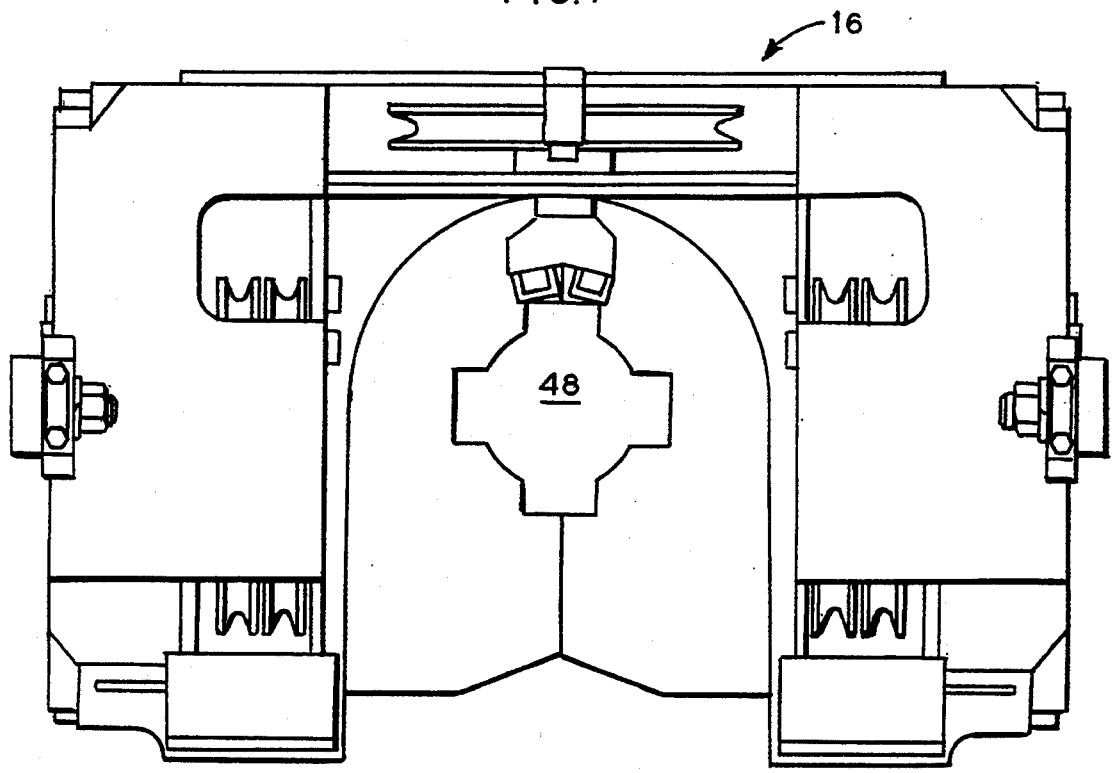
FIG. 7 is a plan view of the travel block.
Figure 8:
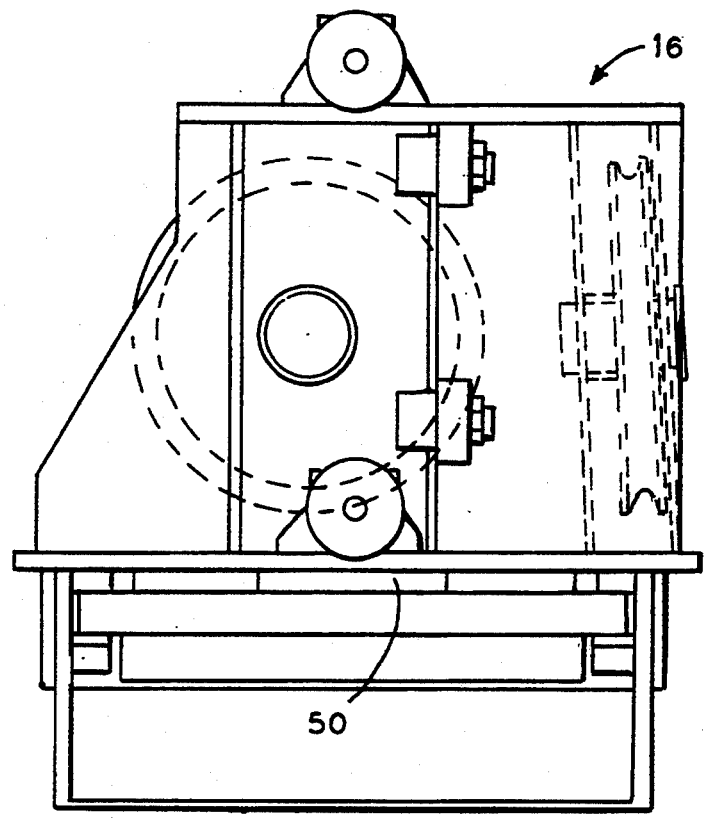
FIG. 8 is an elevation view of the travel block.

Travel block 16, seen in FIG. 7 and 8, is adapted to support the weight of a pipe joint or the pipeline. As seen in FIG. 7, travel block 16 is formed from two sections each having a cutout that defines an opening 48 with a diameter sized to receive a section of pipe when the two travel block sections are adjacent each other. The two sections of travel block 16 are movable between a first closed position adjacent each other and a second open position. The diameter of opening 48 is smaller than the diameter of buckle arresters 50, seen in elevation in FIG. 8, that are attached to the pipe at predetermined intervals. Opening 48 is shaped to define four rectangular extensions equally spaced apart in an otherwise circular opening. The significance of the shape of opening 48 will be explained below. It can be seen that when in the first closed position, travel block 16 will not allow passage of buckle arrester 50 attached to a pipe 44 and travel block 16 can be used to support a pipe joint during welding of a pipe joint onto the pipeline or during lowering of the pipeline by lowering of travel block 16 in tower 14. In the second open position, opening 48 is large enough to allow passage of buckle arrester 50.

Pedestal 18, seen in FIG. 5 and 6, is similar to travel block 16 in that it is formed from two sections that are designed to be movable between a first closed position and a second open position. When in the first closed position, the two sections define a circular opening 52 sized to receive the pipe being used to lay the pipeline. Base 54 is provided with four vertically extending blocks 56 spaced equally around the circumference of opening 52 that are sized to be of lesser diameter than buckle arrester 50 when pedestal 18 is in its first closed position. Blocks 56 are positioned so as to be in alignment with the four rectangular extensions in opening 48 in travel block 16. This allows for a direct transfer of the weight of a pipe joint or the pipeline via buckle arrester 50 from travel block 16 to pedestal 18 as travel block 16 is used to lower the pipeline. Blocks 56 protrude through the rectangular extensions in opening 48 as travel block 16 is lowered and engage buckle arrester 50 to provide an automatic weight transfer to pedestal 18. Travel block 16 is then moved to its second open position to clear the buckle arrester and may then be moved back up to the top of tower 14 in preparation for the next pipe joint to be added to the pipeline. Base 54 is supported by two separate plates 57 that are movable relative to each other. As seen in FIG. 12, pedestal 18 is supported by movable deck 13 and aligned with a hole provided therethrough.

Internal pipe clamp 19, seen in phantom view in FIG. 9, is retained inside a housing 58 that serves as a means for aligning and inserting clamp 19 with and into a pipe joint 44 that is being held in tower 14 by strongback 20. Alignment means is necessary for the following reasons. The pipe laying operations are conducted in a near vertical position. As a result, it would be extremely difficult or impossible to lower clamp 19, hanging by a cable in a normal vertical position, into a pipe that is not in a vertical position due to the position of tower 14 and strongback 20. Housing 58 is sized to be received over the end of the pipe so that clamp 19 is easily lowered into the pipe for welding operations. Means for positioning housing 58 over the pipe is provided in the form of hydraulic cylinders 60 that are attached to tower 14 and adapted via arms 62 to cause the desired movement of housing 58 between a first retracted position and a second extended position in alignment with the pipe joint.

Figure 11:
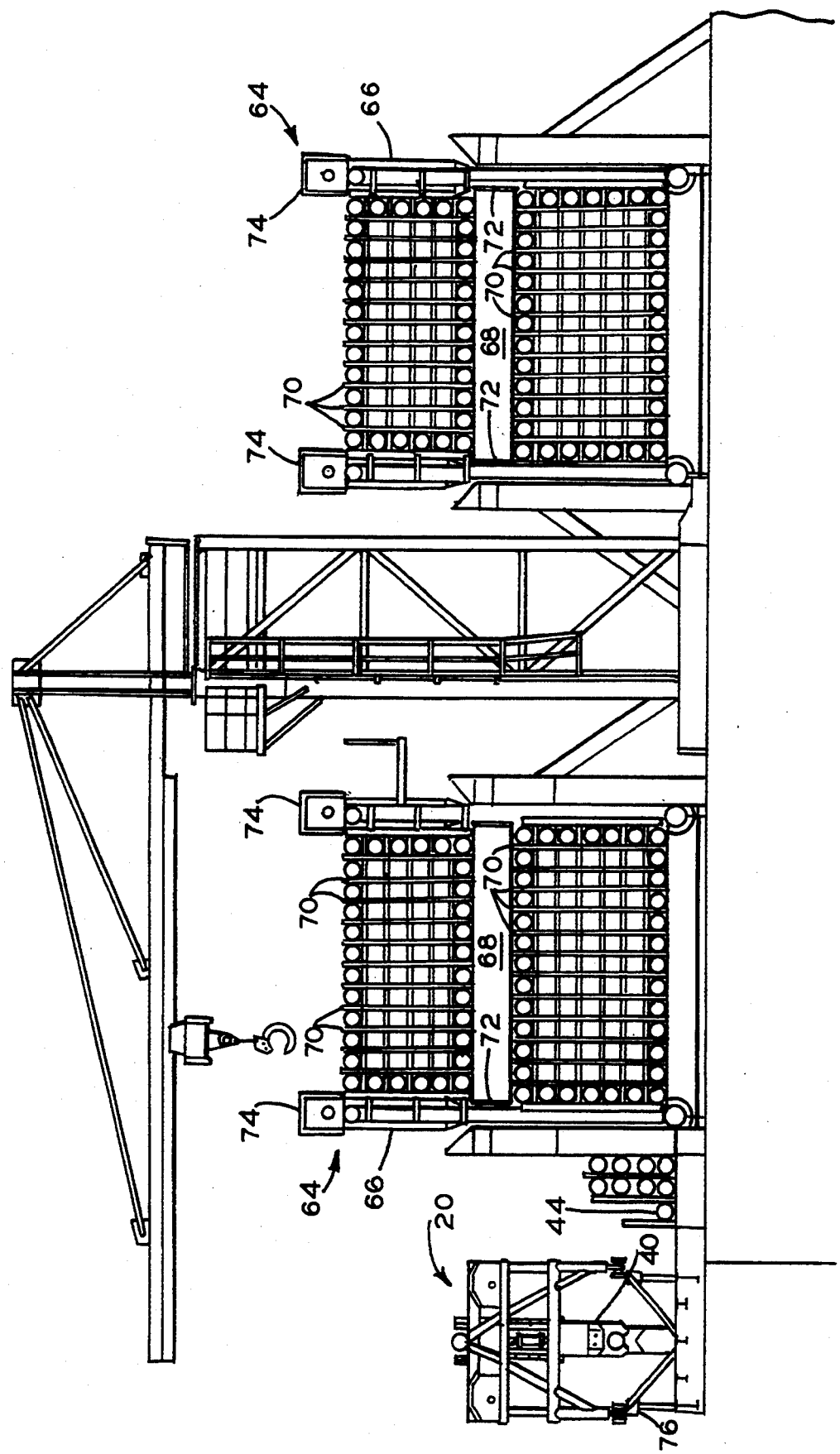
FIG. 11 is an elevation facing sternward on the lay vessel that illustrates the pipe bins, pipe ready rack, and strongback.

FIG. 11 is an end view of pipe bins 64 that provide for the storage, transport, and transfer between vessels of pipe joints to be used in a pipe laying operation. Prior art containers were unable to store a large quantity of pipe without crushing the pipe at the bottom of the container and did not provide a safe way of transferring large quantities of pipe from one vessel to another. Pipe bins 64 solve these problems. A rectangular U-shaped frame 66 seen in FIG. 1 is divided into upper and lower storage sections and is provided with a plurality of vertically extending horizontal spacers 70. Horizontal supports 68 are removably received in and supported by rectangular frame 66. Each support 68 is also provided with a plurality of vertically extending horizontal spacers 70 that are spaced apart according to the size pipe to be used in the pipe laying operation. As seen in the end view of FIG. 11, horizontal supports 68 are provided with a flange 72 on each end that is received in frame 66 to place the load of support. 68 and the pipe loaded thereon on rectangular frame 66 instead of the pipe in the lower section of frame 66. Horizontal spacers 70 are provided at suitable intervals along the length of supports 68 and the bottom of frame 66. Horizontal spacers 70 prevent the pipe from rolling in the bin during rough seas and presenting a safety hazard or damaging the pipe. Any suitable supporting material such as lumber may be used between layers of pipe to evenly spread the load and prevent direct pipe contact that could damage the ends of the pipe. Padeyes or lifting bales 74 are provided on frame 66 to allow transfer of pipe bin 64 and all pipe stored therein in a single operation.

In operation, a single pipe joint 44 has the ends prepared for welding to the pipeline and is transferred to a pipe ready rack 76. As seen in the end view of FIG. 11, strongback 20 is lowered over ready rack 76 and clamps 40 are used to grasp pipe joint 44. As seen in the sequence of FIG. 1, strongback 20 is then pulled up and guided into tower 14 on rails 30 and 32. The tower may be set from zero degrees to a fifteen degree angle from vertical in the preferred embodiment for laying of pipe in deep water. Clamps 40 on the strongback are used to move the pipe joint into alignment with the pipeline. Rail switch 32 is moved to allow the strongback to move down in tower 14 and onto strongback lowering cylinders 34. The strongback is lowered by cylinders 34 until the end of the pipe joint is the proper distance from the end of the pipeline. Housing 58 is moved into alignment with the top of the pipe joint, internal pipe clamp 19 is lowered into the pipe joint to the proper position at the junction of the pipe joint and pipeline, and pipe clamp 19 is actuated to clamp the ends of the pipe joint and pipeline in the proper position for welding. Travel block 16 is positioned below the upper end of the pipe joint and closed around the buckle arrester on the pipe joint. In the preferred embodiment, strongback 20 and clamps 40 are used to support the pipe joint during the first three weld passes. Clamps 40 are then released from the pipe joint and retracted to allow strongback 20 to be moved out of tower 14 to pick up another pipe joint from ready rack 76. During this time, travel block 16, pedestal 18, and clamps 46 on stinger 22 are used to support the weight of the pipe joint and pipeline during the final welding, examination, and coating process. After the process is completed, clamps 46 on the stinger are opened and travel block 16 is lowered in tower 14 while the lay vessel 24 moves forward. Vertically extending blocks 56 on pedestal 18 protrude through the rectangular cut outs in travel block 16 and receive the weight of the pipeline. Travel block 16 is then opened and raised in tower 14 and strongback 20 is used to position the next pipe joint in alignment for welding to the pipeline and the process is repeated. The ability to transfer the load to the pedestal, free the travel block to move back into position, and have the next pipe joint ready for alignment and welding to the pipeline helps to minimize time required to add pipe joints to the pipeline.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An apparatus for near vertical laying of a pipeline offshore, comprising:
   a. a support frame;
   b. a movable deck pivotally attached to said support frame;
   c. a tower attached to said movable deck and supported by said frame and said movable deck in a near vertical position;
   d. a strongback adapted to hold and deliver a pipe section into said tower;
   e. a travel block adapted for movement along the length of said tower and for receiving and supporting the weight of the pipeline;
   f. a pedestal supported by said movable deck and adapted to receive and support the weight of the pipeline from said travel block, said pedestal being movable between a first open and a second closed position; and
   g. a clamp adapted to hold and align a pipe section held by said strongback in said tower with the pipeline for addition thereto, said clamp being movable between a first retracted position and a second extended position.

2. The apparatus of claim 1, wherein said travel block is movable between a first open and a second closed position.

3. The apparatus of claim 1, further comprising a stinger attached to the lower end of said movable deck.

4. An apparatus for near vertical laying of a pipeline offshore, comprising:
   a. a support frame;
   b. a movable deck pivotally attached to said support frame;
   c. a tower attached to said movable deck and supported by said frame and said movable deck in a near vertical position;
   d. a strongback adapted to hold and deliver a pipe section into said tower;
   e. a travel block adapted for movement along the length of said tower and for receiving and supporting the weight of the pipeline;
   f. a pedestal supported by said movable deck and adapted to receive and support the weight of the pipeline from said travel block, said pedestal being movable between a first open and a second closed position;
   g. an internal pipe clamp supported by said tower and adapted for movement along the length of said tower; and
   h. means for aligning said internal pipe clamp with a pipe section held in said tower for addition to the pipeline.

5. The apparatus of claim 4, wherein said alignment means for said internal pipe clamp comprises a housing attached to said tower and movable between a first retracted position and a second extended position.

6. The apparatus of claim 4, wherein said travel block is movable between a first open and a second closed position.

7. The apparatus of claim 4, further comprising a stinger attached to the lower end of said movable deck.

8. The apparatus of claim 4, further comprising means for aligning a pipe section held by said strongback in said tower with the pipeline for addition thereto.

9. The apparatus of claim 8, wherein said alignment means comprises a clamp adapted to hold a pipe section and be movable between a first retracted position and a second extended position.

10. An apparatus for near vertical laying of a pipeline offshore, comprising:
    a. a support frame;
    b. a movable deck pivotally attached to said support frame;
    c. a tower attached to said movable deck and supported by said frame and said movable deck in a near vertical position;
    d. a strongback adapted to hold and deliver a pipe section into said tower;
    e. means for aligning a pipe section held by said strongback in said tower with the pipeline for addition thereto;
    f. a travel block adapted for movement along the length of said tower and for receiving and supporting the weight of the pipeline;
    g. a pedestal supported by said movable deck and adapted to receive and support the weight of the pipeline from said travel block, said pedestal being movable between a first open and a second closed position;
    h. an internal pipe clamp supported by said tower and adapted for movement along the length of said tower; and
    i. means for aligning said internal pipe clamp with a pipe section held in said tower for addition to the pipeline.

11. The apparatus of claim 10, wherein said alignment means for a pipe section held by said strongback comprises a clamp adapted to hold a pipe section and be movable between a first retracted position and a second extended position.

12. The apparatus of claim 10, wherein said travel block is movable between a first open and a second closed position.

13. The apparatus of claim 10, further comprising a stinger attached to the lower end of said movable deck.

* * * * *